(12) United States Patent
Lin

(10) Patent No.: US 8,783,669 B2
(45) Date of Patent: Jul. 22, 2014

(54) PUSH-PUSH TYPE STYLUS EJECT MECHANISM

(75) Inventor: Yu-Yuan Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 993 days.

(21) Appl. No.: 12/874,229

(22) Filed: Sep. 2, 2010

(65) Prior Publication Data
US 2011/0148019 A1  Jun. 23, 2011

(30) Foreign Application Priority Data
Dec. 23, 2009 (TW) .............................. 98144580 A

(51) Int. Cl.
*F16F 1/00* (2006.01)
*G06F 3/0354* (2013.01)

(52) U.S. Cl.
CPC .................................. *G06F 3/03545* (2013.01)
USPC ........................ 267/182; 345/179; 178/19.01

(58) Field of Classification Search
USPC ........................... 267/180, 182; 345/174, 179; 361/679.01, 679.4; 178/19.01
See application file for complete search history.

(56) References Cited

U.S. PATENT DOCUMENTS

| | | | |
|---|---|---|---|
| 6,992,886 B2 * | 1/2006 | Salinas et al. ............ | 361/679.38 |
| 8,390,601 B2 * | 3/2013 | Liang .............................. | 345/179 |
| 2002/0060098 A1 * | 5/2002 | Liu et al. ..................... | 178/19.01 |
| 2004/0119703 A1 * | 6/2004 | Yang et al. ..................... | 345/179 |
| 2006/0132468 A1 * | 6/2006 | Lev et al. ....................... | 345/179 |

\* cited by examiner

*Primary Examiner* — Christopher Schwartz
(74) *Attorney, Agent, or Firm* — CKC & Partners Co., Ltd.

(57) ABSTRACT

A push-push type stylus eject mechanism includes a rail disposed on a substrate, a hook disposed on the substrate, a slide device sliding relative to the substrate, an elastic device connecting the slide device and the hook, and a guide arm having an end pivoted on the slide device and another end having a pin. The slide device could couple to a stylus. The slide device has a pressing element. The rail has a first positioning point and a second positioning point. The pin is moved between the first positioning point and the second positioning point when the stylus is pushed, and the guide arm is pressed by the pressing element to prevent the pin releasing from the rail.

10 Claims, 4 Drawing Sheets

US 8,783,669 B2

PUSH-PUSH TYPE STYLUS EJECT MECHANISM

RELATED APPLICATIONS

This application claims priority to Taiwan Application Serial Number 98144580, filed Dec. 23, 2009, which is herein incorporated by reference.

BACKGROUND

1. Field of Invention

The present invention relates to a stylus eject mechanism. More particularly, the present invention relates to a push-push type stylus eject mechanism.

2. Description of Related Art

With the rapid development of 3C industry, information technology and highly popularized applications of computers, portable and miniature electronic apparatus have been extensively used in daily life. In pursuit of facility and practicality, the tendency of current portable electronic apparatus is toward light, thin, small-footprint designs to meet market expectations. For example, a notebook computer, a personal digital assistant (PDA), a mobile phone, and a smart phone have become popular in daily life.

The stylus is one of the operating devices used to operate the electronic apparatus. The stylus is positioned in the stylus containing chamber of the electronic apparatus when the stylus is not in use, and the stylus is pulled from the stylus containing chamber to operate the portable electronic apparatus. A push-push type stylus eject mechanism is a popular latch mechanism for positioning the stylus, wherein the stylus is positioned in the portable electronic apparatus when the stylus is pushed, and the stylus can be ejected from the portable electronic apparatus when the stylus is pushed again. The tendency of the portable electronic apparatus is becoming lighter and lighter, thus how to reduce the space of the push-push type stylus eject mechanism for positioning the stylus has become a problem.

SUMMARY

It is therefore an objective of the present invention to provide a push-push type stylus eject mechanism to reduce the space for positioning the stylus in the electronic apparatus.

An aspect of the invention provides a push-push type stylus eject mechanism, which includes a rail disposed on a substrate and having a first positioning point and a second positioning point, a hook disposed on the substrate, a slide device sliding relative to the substrate, an elastic device connecting the slide device and the hook, and a guide arm having an end pivoted on the slide device and another end having a pin. The slide device includes a coupling portion for coupling to a stylus and a pressing element. The pin is moved between the first positioning point and the second positioning point when the stylus is pushed, and the guide arm is pressed by the pressing element to prevent the pin releasing from the rail.

The rail can be a heart-shaped rail. The push-push type stylus eject mechanism further includes a protrusion disposed on the substrate. The slide device includes a slot. The protrusion is located in the slot and the slot slides relative to the protrusion when the slide device slides relative to the substrate. The slot can be a T-shaped slot. The coupling portion has plural clamping arms to couple to the stylus. Each clamping arm has a salient, and the stylus has an annular groove, and the salients are coupled to the annular groove. The pressing element can be V-shaped or U-shaped. The push-push type stylus eject mechanism further includes a containing chamber disposed on the substrate to contain the stylus. The substrate includes a housing of an electronic apparatus. The elastic device can be a spring.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
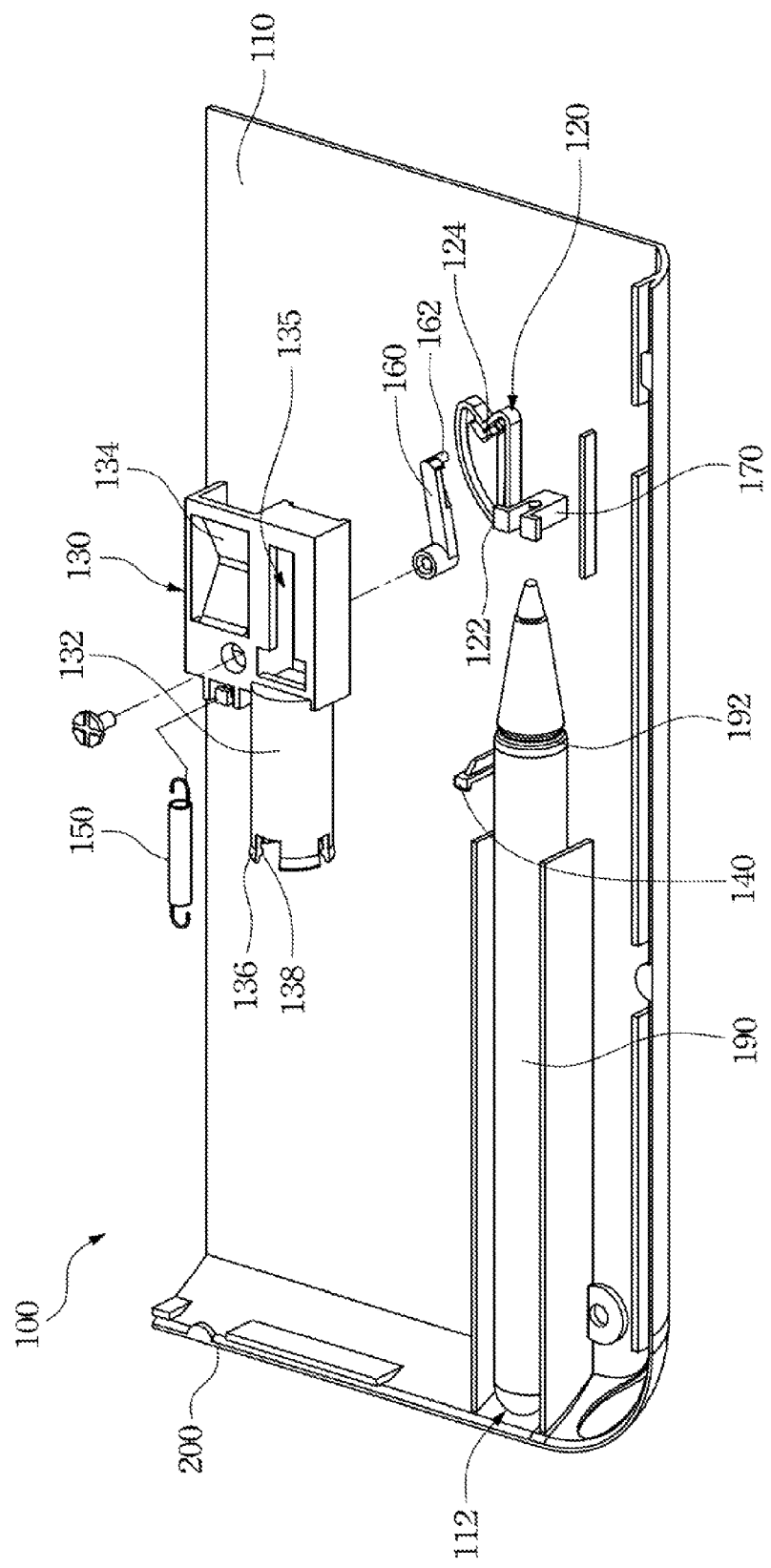
FIG. 1 is an explosion diagram of an embodiment of the push-push type stylus eject mechanism of the invention.

Reference will now be made in detail to the present embodiments of the invention, examples of which are illustrated in the accompanying drawings. Wherever possible, the same reference numbers are used in the drawings and the description to refer to the same or like parts.

In the following descriptions of this specification, electronic device which is mentioned below can be a hand held electronic apparatus, such as Personal Digital Assistant (PDA), electronic translator, Notebook (NB), mobile phone or the like. Also, "push-push type" eject mechanism in the invention can be named as "push-lock and push-release type", "push-lock and push-open type", or "alternate type" of eject mechanism.

Refer to FIG. 1. FIG. 1 is an explosion diagram of an embodiment of the push-push type stylus eject mechanism of the invention. The push-push type stylus eject mechanism 100 is utilized in the electronic apparatus 200 to position the stylus 190 in the electronic apparatus 200 or to eject the stylus 190 form the electronic apparatus 200. The push-push type stylus eject mechanism 100 is disposed on a substrate 110, which can be a housing for the electronic apparatus 200. The push-push type stylus eject mechanism 100 includes a containing chamber 112 disposed on the substrate 110, a rail 120 disposed on the substrate 110, a slide device 130, a hook 140 disposed on the substrate 110, and an elastic device 150 for connecting the hook 140 and the slide device 150.

The slide device 130 has a coupling portion 132 to couple to the stylus 190. The slide device 130 has a pressing element 134. The push-push type stylus eject mechanism 100 further includes a guide arm 160. An end of the guide arm 160 is pivoted on the slide device 130, and another end of the guide arm has a pin 162 thereon. The pin 162 slides in the rail 120 when the stylus 190 is pushed. The pressing element 134 would press the pin 162 to prevent the pin releasing from the rail 120 when the pin 162 is slid in the rail 120.

The rail 120 can be a heart-shaped rail or an arrow-shaped rail. The tip of the rail 120 points to the containing chamber 112, which holds the stylus 190. The rail 120 has a first positioning point 122 and a second positioning point 124. The first positioning point 122 and the second positioning point 124 are the sharp portions of the rail 120, wherein the first positioning point 122 is arranged between the second positioning point 124 and the stylus 190. Namely the first positioning pint 122 is close to the stylus 190, and the second positioning point 124 is opposite to the stylus 190. The pin 162 of the guide arm 160 is moved between the first positioning point 122 and the second positioning point 124 when the slide device 130 slides relative to the substrate 110.

The coupling portion 132 of the slide device 130 has plural clamping arms 136 for clamping the stylus 190, so that the stylus 190 can be coupled to the coupling portion 132 of the slide device 130. Each clamping arm 136 has a salient 138. The stylus 190 has an annular groove 192. The salients 138 would couple to the annular groove 192 to clamp the stylus 190 between the clamping arms 136 when the stylus 190 inserts into the predetermined position of the containing chamber 112.

The push-push type stylus eject mechanism 100 further includes a protrusion 170 disposed on the substrate 110. The slide device 130 has a slot 135 corresponding to the protrusion 170. The protrusion 170 is located in the slot 135. The slot 135 includes a bar-shaped portion, and the bar-shaped portion is designed parallel to the pushing direction of the stylus 190. The slot 135 slides relative to the protrusion 170 when the slide device 130 slides relative to the substrate 110. The sliding route of the sliding device 130 is restricted by the bar-shaped portion of the slot 135.

The substrate 110 can be a housing of the electronic apparatus 200. The material of the slide device 130 can be metal or plastic. The elastic device 150 is a spring. The shape of the slot 135 can be T-shaped for better assembling the protrusion. The shape of the cross-section of the pressing element 134 can be V-shaped, U-shaped. The pressing element 134 contacts the guide arm 16 and presses the guide arm 160.

Figure 2A:
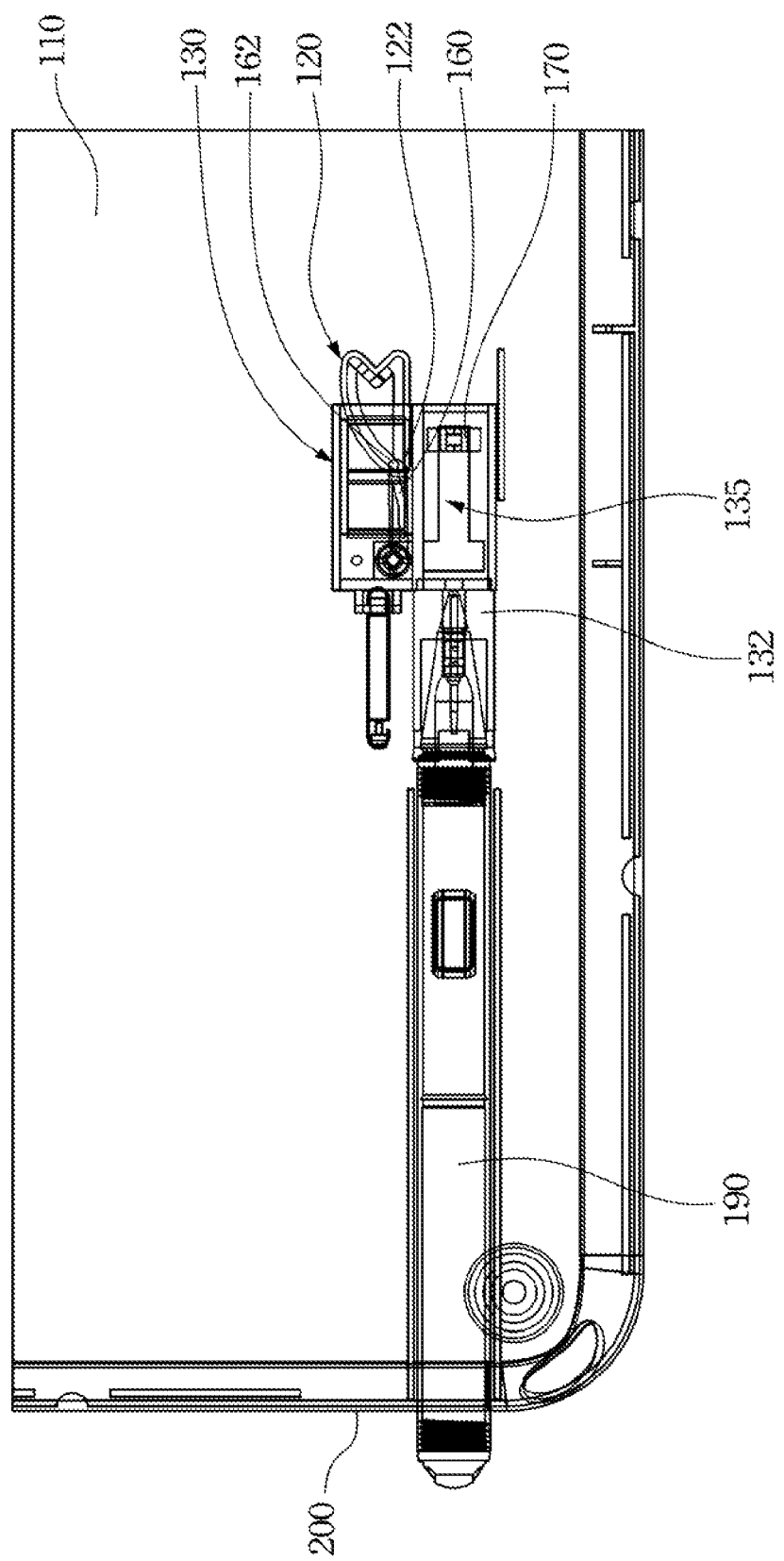
FIG. 2A and FIG. 2B are schematic diagrams of different states of the push-push type stylus eject mechanism in FIG. 1.
Figure 2B:
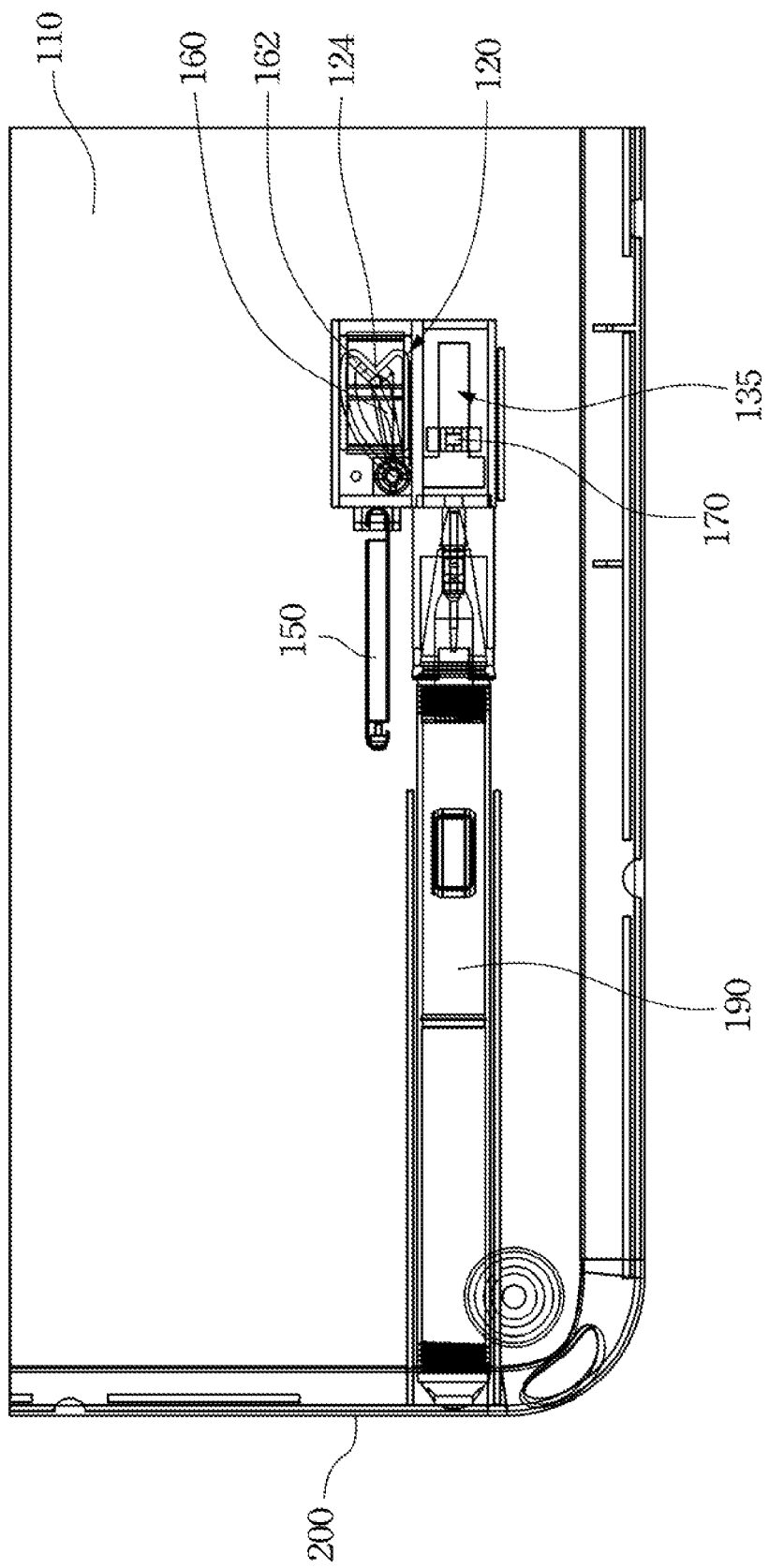

Refer to FIG. 2A and FIG. 2B. FIG. 2A and FIG. 2B are schematic diagrams of different states of the push-push type stylus eject mechanism in FIG. 1. The stylus 190 is coupled to the coupling portion 132 of the slide device 130. The slide device 130 slides relative to the substrate 110 when the stylus 190 and the slide device 130 are pushed. The sliding route of the slide device 130 is restricted by the slot 135 and the protrusion 170.

In FIG. 2A, the pin 162 of the guide arm 160 is located at the first positioning point 122 of the rail 120. The stylus 190 is coupled to the slide device 130 and is exposed at the electronic apparatus 200. The stylus 190 is pushed into the electronic apparatus 200, and the slot 135 of the slide device 130, which is coupled to the stylus 190, slides relative to the protrusion 170 of the substrate 110. Thus the guide arm 160 pivoted on the slide device 130 is pushed relatively, and the pin 162 of the guide arm 160 is slide in the rail 120 till to the second positioning point 124, as shown in FIG. 2B.

In FIG. 2B, the stylus 190 is pushed into the electronic apparatus 200, and the pin 162 of the guide arm 160 is located at the second positioning point 124. The elastic device 150 is extended, and a force generated by the deformation of the elastic device 150 would position the pin 162 at the second positioning point 124 in the rail 120, so that slide device 130 and the stylus 190 coupling to the slide device 130 are positioned. When the stylus 190 is pushed again, the slide device 130 slides relative to the substrate 110 along the slot 135, and the pin 162 is departed form the second positioning point 124 and moved to the first positioning point in the rail 120, as shown in FIG. 2A. The stylus 190 is exposed of the electronic apparatus 200, and the user can pull out the stylus 190 from the slide device 130.

Figure 3:
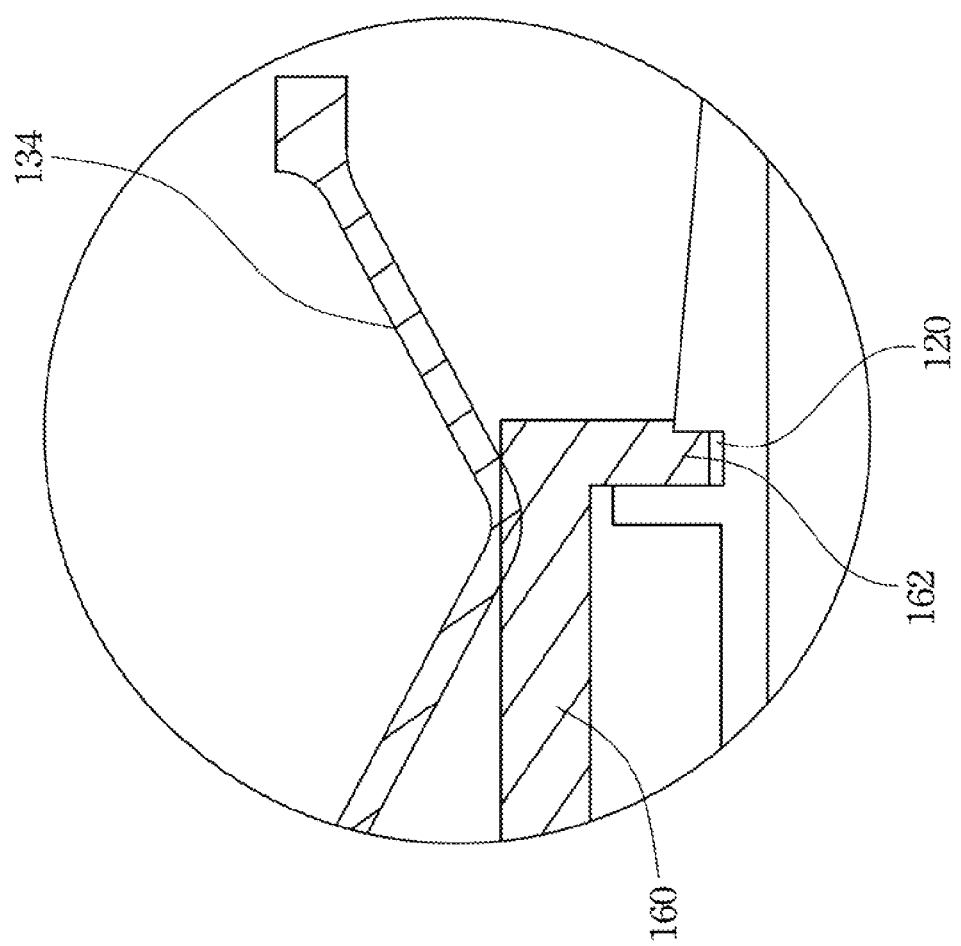
FIG. 3 is a partial side view diagram of the push-push type stylus eject mechanism in FIG. 2A.

Refer to FIG. 3. FIG. 3 is a partial side view diagram of the push-push type stylus eject mechanism in FIG. 2A. The pressing element 134 contacts and slightly interferes the guide arm 160 to provide a pressing force to the guide arm 160 when the pin 162 is slid in the rail. The pin 162 of the guide arm 160 can be slid in the rail 120 stably but not releasing from the rail 120 by the pressing force provided by the pressing element 134.

According to the above descriptions, the pressing element of the slide device can provide the pressing force to the guide arm to ensure the pin moving in the rail stably but not releasing from the rail in the push-push type stylus eject mechanism.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A push-push type stylus eject mechanism comprising:
   a rail disposed on a substrate, the rail comprising a first positioning point and a second positioning point;
   a hook disposed on the substrate;
   a slide device sliding relative to the substrate, the slide device comprising:
      a coupling portion for coupling to a stylus; and
      a pressing element;
   an elastic device connecting the slide device and the hook; and
   a guide arm having an end pivoted on the slide device and another end having a pin, wherein the pin is moved between the first positioning point and the second positioning point when the stylus is pushed, and the guide arm is pressed by the pressing element to prevent the pin releasing from the rail.

2. The push-push type stylus eject mechanism of claim 1, wherein the rail is a heart-shaped rail.

3. The push-push type stylus eject mechanism of claim 1, further comprising a protrusion disposed on the substrate, and the slide device comprising a slot, wherein the protrusion is located in the slot and the slot slides relative to the protrusion when the slide device slides relative to the substrate.

4. The push-push type stylus eject mechanism of claim 3, wherein the slot is a T-shaped slot.

5. The push-push type stylus eject mechanism of claim 1, wherein the coupling portion comprises a plurality of clamping arms to couple to the stylus.

6. The push-push type stylus eject mechanism of claim 5, wherein each clamping arm has a salient, and the stylus has an annular groove, and the salients are coupled to the annular groove.

7. The push-push type stylus eject mechanism of claim 1, wherein the shape of the pressing element is V-shaped or U-shaped.

8. The push-push type stylus eject mechanism of claim 1, further comprising a containing chamber disposed on the substrate to contain the stylus.

9. The push-push type stylus eject mechanism of claim 1, wherein the substrate comprising a housing of an electronic apparatus.

10. The push-push type stylus eject mechanism of claim 1, wherein the elastic device is a spring.

* * * * *